Nov. 23, 1937. C. O. NELSON 2,099,940
CHAIN JACK
Filed Nov. 5, 1935
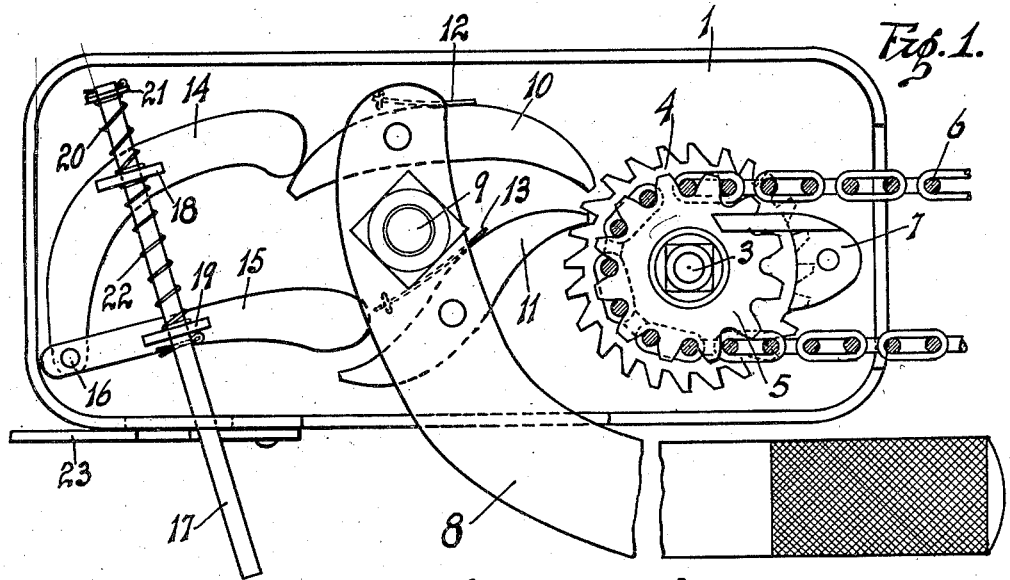
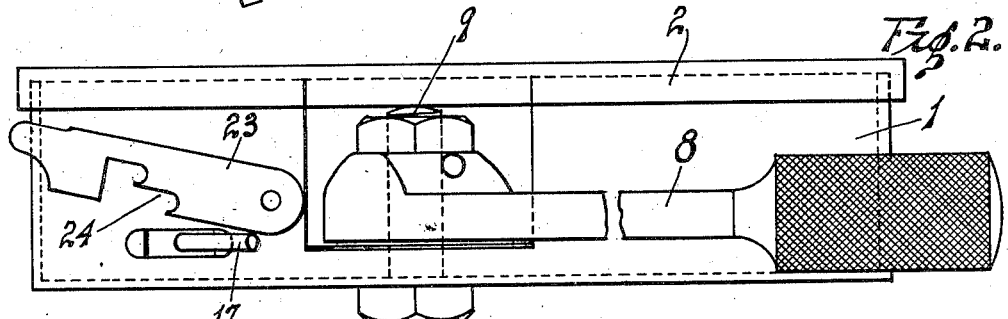
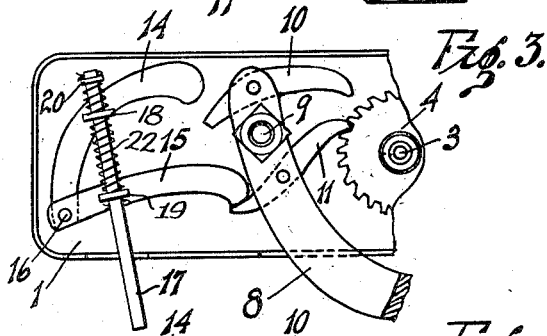
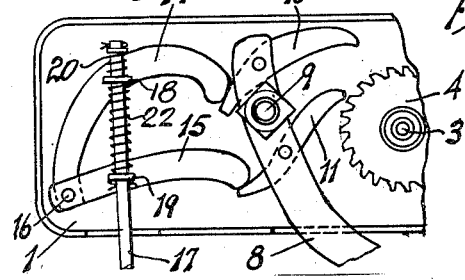
INVENTOR.
CARL ORVILLE NELSON.
BY
ATTORNEY.

Patented Nov. 23, 1937

2,099,940

UNITED STATES PATENT OFFICE 2,099,940

CHAIN JACK

Carl Orville Nelson, Long Beach, Calif.

Application November 5, 1935, Serial No. 48,317

5 Claims. (Cl. 254—171)

This invention relates to a chain jack, particularly useful in tightening a chain, belt or the like, which chain or belt extends over a load on a truck, or the like.

An object of my invention is to provide a novel means of controlling the rack—engaging dogs so that movement of the handle will cause forward or rearward motion of the rack, and the dogs can also be entirely released from the rack so that the rack will turn freely.

Another object is to provide a chain jack which is compact and which can be mounted on a truck or the like for the purpose of tightening a chain over a load, said jack occupying a small space.

Other objects, advantages and features of invention may appear from the accompanying drawing, the subjoined detailed description, and the appended claims.

In the drawing—

Figure 1 is a plan view of my chain jack with the cover removed.

Figure 2 is a side elevation of the jack.

Figure 3 is a fragmentary diagrammatic view showing dogs in reverse position.

Figure 4 is a fragmentary diagrammatic view of the jack showing the dogs in released position.

Referring more particularly to the drawing, the numeral 1 indicates a substantially rectangular housing in which the jack mechanism—to be subsequently described—is disclosed. A suitable cover 2 closes the top of the housing and this cover is attached to the housing in any suitable manner.

A shaft 3 is journaled in the housing 1 and a gear rack 4 is non-rotatably mounted on the shaft. A sprocket 5 is also non-rotatably mounted on the shaft 3. A chain 6 encircles the sprocket 5, and this chain extends over a load on a truck, or is adapted for any other useful purpose. The lower reach of the chain is the one under tension and carries the load. A guide 7 adjacent the sprocket 5 prevents the upper reach of the chain 6 from sagging when the sprocket 5 is reversed.

A jack handle 8 is pivotally mounted on a stud 9, said stud being fixedly mounted in the housing 1. A pair of dogs 10, 11 are pivotally mounted on the handle 8, said dogs being mounted above and below the stud 9, as shown in Figs. 1, 3, and 4. The dogs 10, 11 are yieldably pressed into the gear rack 4 by means of light springs 12, 13, respectively. A pair of control fingers 14, 15 are pivotally mounted in the housing 1 on the pin 16. The free ends of the fingers are adapted to be yieldably pressed against the inner ends of the dogs 10, 11, respectively, as will be subsequently described.

A control arm 17 is slidably mounted in lugs 18, 19, which lugs are fixedly attached or formed on the fingers 14, 15, respectively. A spring 20 surrounds the arm and extends between the lug 18 and a shoulder 21 on the inner end of the arm 17. A second spring 22 surrounds the arm and extends between the lugs 18 and 19. When the arm 17 is in the position shown in Figs. 1 and 2, the finger 15 does not engage the dog 11 and the spring 13 presses the engaging end of the dog into the gear rack 4. As the handle 8 and the dog 11 rotate the gear 4, the dog 10 is lightly engaged by the finger 14 to swing the dog 11 out of engagement with the gear 4. When the handle is moved back for another bite on the gear 4, the dog 10 disengages the finger 14 and engages the gear 4 to prevent back rotation of the gear. Movement of the handle 8 about its pivot will now rotate the gear rack 4 in a clockwise direction. When the arm 17 is pulled towards the left, as viewed in Fig. 1, and slid longitudinally in the lugs 18 and 19 the spring 22 will be placed in compression and the finger 15 will be forced downwardly against the projecting end of the dog 11, as shown in Fig. 3. Movement of the handle 8 will now permit the gear rack 4 to be rotated in a counterclockwise direction under the force exerted by the load reach of the chain 6.

A further movement of the arm 17 to the left, as viewed in Fig. 1, will cause each of the springs 20, 22 to be compressed and each of the fingers 14, 15 will be pressed against the dogs 10, 11, respectively. This causes the dogs to be raised out of engagement with the gear rack 4, as shown in Fig. 4. The chain may now be freely moved in either direction, for the desired purpose.

It will be noted that the jack can be adjusted for forward, reverse or free spooling, without placing the fingers in a dangerous position adjacent the dogs, the chain, or the gear rack.

A latch plate 23 is pivotally mounted on the housing 1, adjacent the arm 17. The latch plate is provided with a plurality of notches 24 into which the arm 17 is adapted to fit. The arm is thus held in one of two positions, namely, for reverse movement of the gear rack, or free spooling.

Having described my invention, I claim:

1. In a chain jack comprising a housing, a gear rack journaled in the housing, a sprocket rotatable with the gear rack, and a handle pivotally mounted in the housing adjacent the gear rack, a pair of dogs pivotally mounted on the handle, one end of said dogs being adapted to engage the gear rack and to rotate same as said handle is operated, a pair of fingers pivotally mounted in the housing, each one of said fingers being engageable with one of the dogs, and means selectively pressing said fingers against the dogs whereby the dogs are controlled to permit reverse movement of the gear rack and free movement of the gear rack.

2. In a chain jack comprising a housing, a gear rack journaled in the housing, a sprocket rotatable with the gear rack, and a handle pivotally mounted in the housing adjacent the gear rack, a pair of dogs pivotally mounted on the handle, one end of said dogs being adapted to engage the gear rack and to rotate same as said handle is operated, a pair of fingers pivotally mounted in the housing, each one of said fingers being engageable with one of the dogs, a control arm, a spring means bearing against said fingers, said spring means being operable by the control arm whereby said fingers are selectively and yieldably pressed against the dogs to permit free movement of the gear rack and reverse movement thereof.

3. In a chain jack comprising a housing, a gear rack journaled in the housing, a sprocket rotatable with the gear rack, and a handle pivotally mounted in the housing adjacent the gear rack, a pair of dogs pivotally mounted on the handle, one end of said dogs being adapted to engage the gear rack and to rotate same as said handle is operated, a pair of fingers pivotally mounted in the housing, each of said fingers being engageable with one of the dogs, a control arm slidably mounted on each of the fingers, a pair of springs on the control arm, each one of the springs bearing against one of the fingers, said control arm—when guided—being adapted to compress one or both of the springs whereby one or both of the arms are yieldably pressed against the dogs.

4. In a chain jack comprising a housing, a gear rack journaled in the housing, a sprocket rotatable with the gear rack, and a handle pivotally mounted in the housing adjacent the gear rack, a pair of dogs pivotally mounted on the handle, one end of said dogs being adapted to engage the gear rack and to rotate same as said handle is operated, a pair of fingers in the housing, both of said fingers being pivotally mounted on a pin, a lug on each of the fingers, a control arm slidably mounted in the lugs, a spring extending between the end of the control arm and one of the lugs, a second spring extending between said lugs, said control arm being adapted and arranged to place one or both of the springs in compression whereby one or both of the fingers are yieldably pressed against one or both of the dogs.

5. In a chain jack comprising a housing, a gear rack journaled in the housing and a handle pivotally mounted in the housing adjacent the gear rack, a pair of dogs pivotally mounted on the handle, said dogs being positioned one on each side of the handle pivot, one end of said dogs being adapted to engage the gear rack and to rotate same as said handle is operated, a pair of fingers pivotally mounted in the housing, a lug on each of the fingers, a control arm slidably mounted in the lugs, a spring extending between said lugs and bearing against both, said control arm being adapted and arranged to place one or both of the springs in compression whereby one or both of the fingers is yieldably pressed against one or both of the dogs.

CARL ORVILLE NELSON.